(12) United States Patent
Paradise

(10) Patent No.: US 9,976,745 B2
(45) Date of Patent: May 22, 2018

(54) IMAGE CONDUIT FOR FUEL NOZZLE ASSEMBLIES

(71) Applicant: Delavan Inc, West Des Moines, IA (US)

(72) Inventor: Bruce D. Paradise, Avon, CT (US)

(73) Assignee: Delavan Inc., West Des Moines, IA (US)

( * ) Notice: Subject to any disclaimer, the term of this patent is extended or adjusted under 35 U.S.C. 154(b) by 158 days.

(21) Appl. No.: 14/821,284

(22) Filed: Aug. 7, 2015

(65) Prior Publication Data

US 2017/0038073 A1 Feb. 9, 2017

(51) Int. Cl.
| | |
|---|---|
| *G02B 6/00* | (2006.01) |
| *F23R 3/28* | (2006.01) |
| *G02B 6/44* | (2006.01) |
| *G01J 5/00* | (2006.01) |
| *G01J 5/08* | (2006.01) |

(52) U.S. Cl.
CPC .............. *F23R 3/28* (2013.01); *G01J 5/0088* (2013.01); *G01J 5/0821* (2013.01); *G02B 6/443* (2013.01); *G02B 6/4488* (2013.01)

(58) Field of Classification Search
CPC ......... G02B 6/443; G02B 6/4488; F23R 3/28; G01J 5/0088; G01J 5/0821
See application file for complete search history.

(56) References Cited

U.S. PATENT DOCUMENTS

| | | | | |
|---|---|---|---|---|
| 4,181,397 A | * | 1/1980 | Baker | G02B 6/403 385/54 |
| 4,184,743 A | * | 1/1980 | Baker | G02B 6/403 385/100 |
| 4,313,344 A | * | 2/1982 | Brogardh | G01J 5/0044 374/126 |
| 4,418,984 A | | 12/1983 | Wysocki et al. | |
| 5,071,105 A | * | 12/1991 | Donze | B23K 7/06 266/100 |
| 5,367,869 A | | 11/1994 | DeFreitas | |
| 5,828,797 A | | 10/1998 | Minott et al. | |
| 5,971,623 A | | 10/1999 | Wanamaker | |
| 6,090,210 A | * | 7/2000 | Ballance | C23C 16/45565 118/50.1 |

(Continued)

FOREIGN PATENT DOCUMENTS

| | | |
|---|---|---|
| WO | 2001011331 | 2/2001 |
| WO | 2015058183 | 4/2015 |

*Primary Examiner* — Rhonda Peace
(74) *Attorney, Agent, or Firm* — Locke Lord LLP; Scott D. Wofsy; Joshua L. Jones

(57) ABSTRACT

A fuel nozzle for a gas turbine engine includes a feed arm including a fuel passage for issuing a spray of fuel. A nozzle assembly is fixed at an upstream end of the feed arm having a fuel inlet in fluid communication with the fuel passage. A fiber optic cable is configured to collect burner radiation for a pyrometer input and has a first end centered within an optical connector of the nozzle assembly and a second end exposed from the spray outlet. The fiber optic cable fitted within the feed arm and nozzle assembly has a permanent bend radius preformed in the fiber optic cable. The bend radius can be equal to or greater than the minimum bend radii for the fiber optic cable to serve as a wave guide in wavelengths for monitoring combustion.

8 Claims, 1 Drawing Sheet

(56) References Cited

U.S. PATENT DOCUMENTS

| | | | |
|---|---|---|---|
| 6,190,732 B1* | 2/2001 | Omstead | C23C 16/4408 |
| | | | 118/729 |
| 6,227,702 B1 | 5/2001 | Yamada et al. | |
| 6,249,629 B1 | 6/2001 | Bringuier | |
| 6,993,240 B2 | 1/2006 | Kashihara et al. | |
| 7,334,413 B2* | 2/2008 | Myhre | F01D 17/02 |
| | | | 431/13 |
| 7,492,998 B2 | 2/2009 | Miller et al. | |
| 7,966,834 B2* | 6/2011 | Myhre | F23M 11/045 |
| | | | 60/740 |
| 7,987,712 B2* | 8/2011 | Myhre | F23M 11/045 |
| | | | 239/74 |
| 8,184,151 B2 | 5/2012 | Zombo et al. | |
| 8,565,564 B2 | 10/2013 | Fitz et al. | |
| 8,577,195 B2 | 11/2013 | Terlizzi et al. | |
| 8,582,942 B1 | 11/2013 | Burnett | |
| 8,934,748 B2 | 1/2015 | Rice et al. | |
| 2006/0146909 A1* | 7/2006 | Morse | G01J 3/1895 |
| | | | 374/130 |
| 2011/0013905 A1 | 1/2011 | Wang et al. | |
| 2012/0073301 A1* | 3/2012 | Paradise | F02C 7/228 |
| | | | 60/746 |
| 2012/0327971 A1 | 12/2012 | Goda | |
| 2015/0003795 A1 | 1/2015 | Baca et al. | |
| 2017/0038073 A1* | 2/2017 | Paradise | F23R 3/28 |

* cited by examiner

IMAGE CONDUIT FOR FUEL NOZZLE ASSEMBLIES

BACKGROUND OF THE INVENTION

1. Field of the Invention

The present disclosure relates to turbine engine components, and more particularly to fiber optic cables such as used in imaging systems during operation of a gas turbine engine.

2. Description of Related Art

Optical fiber technology has enabled imaging systems known as industrial endoscopes (or borescopes) which are widely used in various industrial applications. Such imaging systems can provide several diagnostic advantages. For example, to inspect internal structures that are otherwise inaccessible and cannot be inspected with direct line of sight imaging or, for example, maintaining conditions of a combustor, such as a gas turbine combustor, which are diagnosed on the basis of the luminance of flames measured with a fiber optic cable during combustion.

Fiber optic cables for combustion and industrial process monitoring and diagnosis in gas turbine and aircraft engine applications require rugged equipment and a high signal level. Generally such fiber optic cables include bundles of multiple fibers. These designs can be bulky and expensive because of special components needed for coupling and packaging. Fiber optic cables also require a large minimum bend radius which is tied to the refraction index and external reflective coating on each glass fiber to prevent loss of light from the wave guide. These bend radii can be too large to thread through a traditional fuel nozzle to make any necessary sharp turns to view the combustor effectively.

Such conventional methods and systems have generally been considered satisfactory for their intended purpose. However, there is still a need in the art for improved fiber optic cables for fuel nozzles. The present disclosure provides a solution for this need.

SUMMARY OF THE INVENTION

A fuel nozzle for a gas turbine engine includes a feed arm including a fuel passage for issuing a spray of fuel. A nozzle assembly is fixed at an upstream end of the feed arm having a fuel inlet in fluid communication with the fuel passage. A fiber optic cable is configured to collect burner radiation for a pyrometer input and has a first end centered within an optical connector of the nozzle assembly and a second end exposed from the spray outlet. The fiber optic cable fitted within the feed arm and nozzle assembly has a permanent bend radius preformed in the fiber optic cable. The bend radius can be equal to or greater than the minimum bend radii for the fiber optic cable to serve as a wave guide in wavelengths for monitoring combustion.

The fiber optic cable can include a rigid metal sheath enclosing a plurality of individual wave guides. Each wave guide can be spaced apart from the other wave guides such that interstitial sites between each wave guide can be filled with compacted alumina powder. Each wave guide is made up of fibers coated and bonded to adjacent fibers.

Each wave guide can be 0.017 inches in diameter such that the metal sheath has a minimum bend radius of three times the wave guide diameter. For example, the metal sheath can have bend radius of 0.5 inches.

The fiber optic cable can include seven wave guides with a center wave guide and six wave guides circumferentially spaced around the center wave guide. Each of the wave guides are the same diameter such that a 1/7th reduction in expected signal strength can indicate breakage of one of the wave guides. Each wave guide can be configured to serve as a waveguide within the range of 430 nm to 1400 nm.

A method of constructing a fiber optic cable for a fuel nozzle includes inserting seven wave guides into a metal sheath with alumina powder spaced apart from the other wave guides. The metal sheath is drawn through a round reduction die to compress the alumina powder and fibers together and the metal sheath can be annealed.

The method can further include forming at least one bend of a predetermined radius in the metal sheath by heating the metal sheath and applying a bending force to form the bend radius so as not to exceed the minimum bend radius of the wave guides with respect to wavelengths for monitoring combustion.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
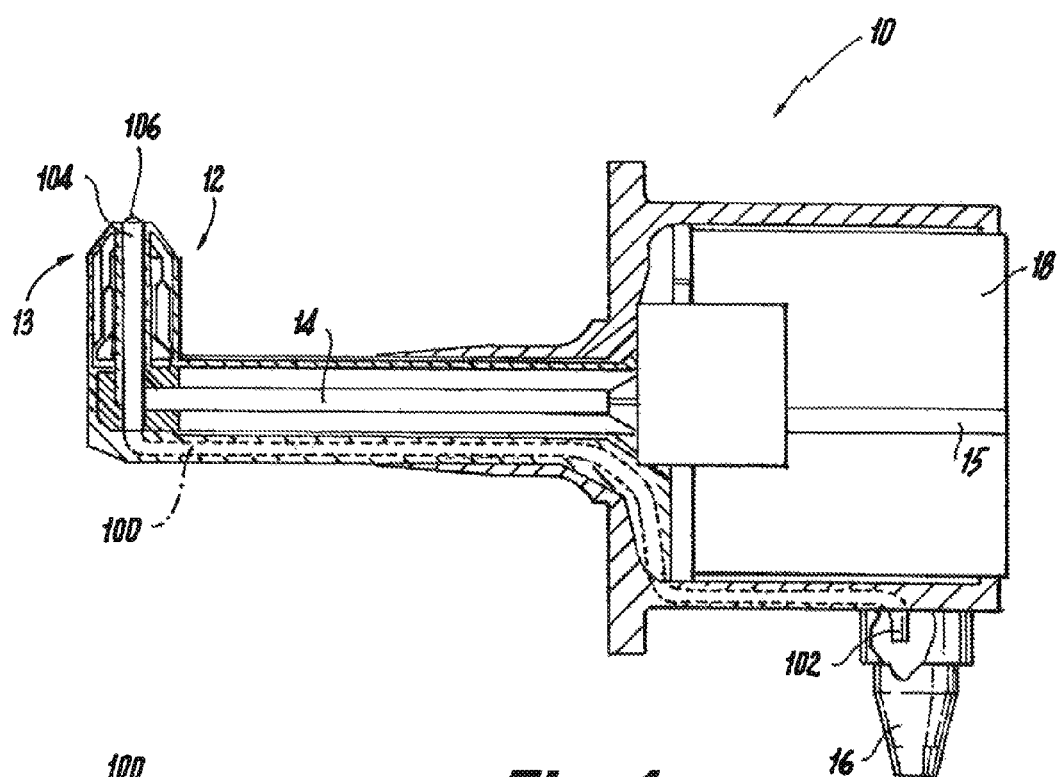
FIG. 1 is a cross-sectional view of an exemplary embodiment of a fuel nozzle constructed in accordance with the present disclosure, showing a fiber optic cable threaded therethrough including a minimum bend radius.

Reference will now be made to the drawings wherein like reference numerals identify similar structural features or aspects of the subject disclosure. For purposes of explanation and illustration, and not limitation, a partial view of an exemplary embodiment of an image conduit for a fuel nozzle in accordance with the disclosure is shown in FIG. 1 and is designated generally by reference character 100. Other embodiments of the image conduit in accordance with the disclosure, or aspects thereof, are provided in FIG. 2, as will be described.

With reference to FIG. 1, a cross-sectional view of a fuel nozzle 10 is shown. The fuel nozzle 10 is associated with a gas turbine engine. Gas turbine engines, such as those which power modern aircrafts, include a compressor for pressurizing a supply of air, a combustor for burning a hydrocarbon fuel in the presence of the pressurized air, and a turbine for extracting energy from the resultant combustion gases. The combustor generally includes radially spaced apart inner and outer liners that define an annular combustion chamber therebetween. A plurality of circumferentially distributed fuel injectors axially project into a forward section of the combustion chamber to supply the fuel to be mixed with the pressurized air. The fuel nozzle 10 injects/atomizes the fuel into the combustor air stream. The fuel nozzle 10 includes a feed arm 12 with a fuel passage 14 for directing fuel from a fuel inlet 15 of a nozzle assembly 18 to a spray outlet 13 of the feed arm 12. During operation, compressed air flows past the nozzle assembly 18 while fuel is injected continuously and a flame occupies two to six inches from the tip. A fiber optic cable 100 is threaded through the fuel nozzle 10 and configured to collect burner radiation from the flame for pyrometer input for analysis and real-time combustion control.

With continued reference to FIG. 1, the fiber optic cable 100 has a first end 102 centered within an electrical/optical connector 16 and a second end 104 exposed from the spray outlet 13. The second end 104 can optionally include a sapphire lens 106. The light from the flame is transmitted through the sapphire lens 106 to the optical connector and pyrometer for analysis. The fiber optic cable 100 includes a formable metal sheath 110 assembly that is formed under heat to a tight bend radius to fit through the fuel nozzle 10. Once the correct bend radius is formed, the metal sheath assembly 100 is allowed to cool to a fixed rigid shape such that the bend radius is preformed in the fiber optic cable 100.

Figure 2:
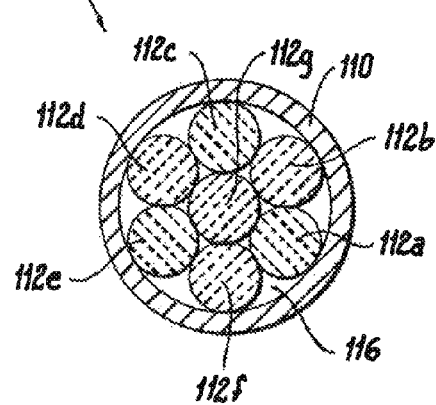
FIG. 2 is a cross-sectional view of the fiber optic cable of FIG. 1, showing a plurality of wave guides.

With reference to FIG. 2, a cross-sectional view of the fiber optic cable 100 is shown. The metal sheath 110 of the fiber optic cable 100 encloses a plurality of individual wave guides 112*a-g*. As shown, seven wave guides 112*a-g* are enclosed within the metal sheath 100. Seven wave guides are included and shown, but any suitable number can be used. The use of seven wave guides 112*a-g* improves the redundancy and reliability in addition to reducing the bend radius. The wave guides 112*a-g* allow for burner radiation to be transmitted from the first end 102 of the fiber optical cable 100 to the second end 104 substantially without a loss of light transmission. The bend radius is greater than or equal to the minimum bend radius for the wave guides 112*a-g* to serve as wave lengths for monitoring combustion. Typical fiber optical cables with tight bends lose light transmission as the light travels through a core or inner channel due to light striking the core at more than a critical angle. However, with the configuration and wave guides 112*a-g* of the present disclosure, each wave guide 112*a-g* has a minimum bend radius limited to three times the wave guide diameter. In keeping with this minimum bend radius, the fiber optic cable 100 is formed with one or more bends without noticeable loss of wave guide effectiveness. Therefore, signal strength at the second end 104 of the fiber optic cable 100 is the same as or comparable to the signal strength detected at the first end 102. Each wave guide 112*a-g* is 0.017 inches in diameter allowing for a minimum bend radius of 0.5 inches. As each of the wave guides 112*a-g* are the same diameter, a 1/7th reduction in expected signal strength indicates breakage of one of the wave guides 112*a-g*.

Each wave guide 112*a-g* is comprised of approximately 918 fibers that are 12 μm in diameter. Those skilled in the art will appreciate that any number of fibers may used without departing from the scope of the present disclosure. The fibers are coated and bonded to adjacent fibers to help prevent the loss of light transmission through the wave guides 112*a-g*. Radiation transmitted through each wave guide 112*a-g* is approximately within the range of 430 nm to 1400 nm. The wave guides 112*a-g* are similar to fused glass optical fiber rods known in the art, for example, fiber optic image conduits manufactured by Edmunds Scientific Corporation of Barrington, N.J. As shown in FIG. 2, the fiber optic cable 100 includes a center wave guide 112*g* with six wave guides circumferentially 112*a-f* spaced around the center wave guide 112*g*. Each of the wave guides 112*a-g* are spaced apart from the other wave guides 112*a-g* with the interstitial sites 116 between each wave guide 112*a-g* filled with compacted alumina powder to provide compliance and reduce mechanical stress due to thermal expansions and vibrations.

During construction of the fiber optic cable, seven wave guides, e.g., wave guides 112*a-g*, are inserted into a metal sheath, e.g. metal sheath 110, with alumina powder filling the interstitial sites, e.g., interstitial sites 116. The metal sheath is then drawn through a round reduction die to compress the alumina powder together. The metal sheath is then annealed. After annealing the metal sheath, the fiber optic cable is heated to about 1300° F. and a bending force is applied to form the desired shape including at least one bend radius so as not to exceed the minimum bend radius of the wave guides. The metal sheath can then be annealed again, if required. The metal sheath is cooled thereby maintaining the preformed shape required for compatibility with the fuel nozzle.

The methods and systems of the present disclosure, as described above and shown in the drawings, provide for a fiber optic cable with superior properties including having a minimum bend radius without a loss of light transmission. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A fuel nozzle for a gas turbine engine, comprising:
   a feed arm including a fuel passage for issuing a spray of fuel;
   a nozzle assembly fixed at an upstream end of the feed arm having a fuel inlet in fluid communication with the fuel passage; and
   a fiber optic cable configured to collect burner radiation for a pyrometer input having a first end centered within an optical connector of the nozzle assembly and a second end exposed from the spray outlet, wherein the fiber optic cable fitted within the feed arm and nozzle assembly has a permanent bend radius preformed in the fiber optic cable,
   wherein the bend radius is equal to or greater than the minimum bend radii for the fiber optic cable to serve as a waveguide for wavelengths for monitoring combustion,
   wherein the fiber optic cable includes a rigid metal sheath enclosing a plurality of individual wave guides,
   wherein each wave guide is 0.017 inches in diameter such that the metal sheath has a minimum bend radius of three times a wave guide diameter.

2. The fuel nozzle of claim 1, wherein each wave guide is spaced apart from the other wave guides.

3. The fuel nozzle of claim 1, wherein interstitial sites between each wave guide are filled with compacted alumina powder.

4. The fuel nozzle of claim 1, wherein the metal sheath has bend radius of 0.5 inches.

5. The fuel nozzle of claim 1, wherein the fiber optic cable includes seven wave guides with a center wave guide and six wave guides circumferentially spaced around the center wave guide.

6. The fuel nozzle of claim 5, wherein each of the wave guides are the same diameter such that a 1/7th reduction in expected signal strength indicates breakage of one of the wave guides.

7. The fuel nozzle of claim 1, wherein wavelengths of light passed through each wave guide are within the range of 430 nm to 1400 nm.

8. The fuel nozzle of claim 1, wherein each wave guide is made up of fibers coated and bonded to adjacent fibers.

* * * * *